(12) United States Patent
Mitchell

(10) Patent No.: US 11,268,856 B1
(45) Date of Patent: *Mar. 8, 2022

(54) ENHANCED CO-REGISTERED OPTICAL SYSTEMS

(71) Applicant: Wavefront Research, Inc., Northampton, PA (US)

(72) Inventor: Thomas A. Mitchell, Northampton, PA (US)

(73) Assignee: Wavefront Research, Inc., Northhampton, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/135,204

(22) Filed: Dec. 28, 2020

Related U.S. Application Data

(63) Continuation of application No. 16/587,502, filed on Sep. 30, 2019, now Pat. No. 10,876,891, which is a continuation of application No. 16/025,233, filed on Jul. 2, 2018, now Pat. No. 10,429,241, which is a continuation of application No. 15/784,510, filed on Oct. 16, 2017, now Pat. No. 10,012,543.

(60) Provisional application No. 62/408,440, filed on Oct. 14, 2016.

(51) Int. Cl.
| | |
|---|---|
| *G01J 3/28* | (2006.01) |
| *G01J 3/02* | (2006.01) |
| *G01J 3/36* | (2006.01) |
| *G01J 3/14* | (2006.01) |
| *G01J 3/18* | (2006.01) |

(52) U.S. Cl.
CPC ............... *G01J 3/2823* (2013.01); *G01J 3/02* (2013.01); *G01J 3/0208* (2013.01); *G01J 3/14* (2013.01); *G01J 3/18* (2013.01); *G01J 3/28* (2013.01); *G01J 3/36* (2013.01); *G01J 2003/2826* (2013.01)

(58) Field of Classification Search
CPC ........ G01J 3/02; G01J 3/28; G01J 3/10; G01J 3/14; G01J 3/18; G01J 3/36
See application file for complete search history.

(56) References Cited

U.S. PATENT DOCUMENTS

| | | | |
|---|---|---|---|
| 6,100,974 A | 8/2000 | Reininger | |
| 10,012,543 B1 | 7/2018 | Mitchell | |
| 10,429,241 B2 | 10/2019 | Mitchell | |
| 10,876,891 B1 * | 12/2020 | Mitchell | ............... G01J 3/0208 |

* cited by examiner

*Primary Examiner* — Abdullahi Nur
(74) *Attorney, Agent, or Firm* — Culhane Meadows PLLC; Orlando Lopez

(57) ABSTRACT

An imaging optical system including a plurality of imaging optical sub-systems, each having at least one optical element and receiving light from a source, and a plurality of spectrometer optical sub-systems, each spectrometer optical sub-system receiving light from at least one of the imaging optical sub-systems, each imaging optical sub-system and spectrometer optical sub-system combination having a spatial distortion characteristic, each spatial distortion characteristic having a predetermined relationship to the other spatial distortion characteristics.

20 Claims, 3 Drawing Sheets

ENHANCED CO-REGISTERED OPTICAL SYSTEMS

CROSS REFERENCE TO RELATED APPLICATIONS

This application is a continuation of co-pending U.S. application Ser. No. 16/587,502, filed on Sep. 30, 2019, entitled ENHANCED CO-REGISTERED OPTICAL SYSTEMS, which is a continuation of co-pending U.S. application Ser. No. 16/025,233, filed Jul. 2, 2018, now U.S. Pat. No. 10,429,241, which is a continuation of U.S. application Ser. No. 15/784,510, filed Oct. 16, 2017, entitled ENHANCED CO-REGISTERED OPTICAL SYSTEMS, now U.S. Pat. No. 10,012,543, which claims priority from U.S. Provisional Patent Application Ser. No. 62/408,440, filed Oct. 14, 2016, entitled ENHANCED CO-REGISTERED OPTICAL SYSTEMS, all which are incorporated herein by reference in their entirety and for all purposes.

STATEMENT OF GOVERNMENT INTEREST

This invention was made with U.S. Government support from the U.S. Army under subcontracts R401-SC-20316-0252 and R401-SC-20316-0273 (Prime W15P7T-06-D-R401) and subcontract WRI-002 (PO 22713, Prime W909MY-12-D-0008/0012). The U.S. Government has certain rights in the invention.

BACKGROUND

The present teachings relate to hyperspectral imaging sensors and particularly to hyperspectral imaging sensors having two or more spectrometers that operate over different spectral bands.

In some applications, spectral algorithms that process data from a combination of both spectral bands are used. Each spectrometer of the hyperspectral imaging sensor that operates in a particular band typically has the individual keystone distortions corrected within its particular band.

In those cases, the magnification and spatial distortion differences between those spectrometers typically differ by amounts greater than a pixel in some portions of the spatial field, making the spectral purity of data for a given object in the scene insufficient to provide reliable results over the combined spectral bands.

There is a need for hyperspectral imaging sensors having spectrometers that operate over different spectral bands and have increased fidelity for the exploitation of spectral algorithms over their combined spectral bands.

SUMMARY OF THE INVENTION

The embodiments of the present invention provide a hyperspectral imaging sensor with increased fidelity for the exploitation of spectral algorithms.

More specifically, the embodiments disclose and describe a hyperspectral imaging optical system made up of at least two individual spectrometers, each operating over a substantially different spectral band (e.g. visible and long-wave infrared). Although systems of this type, both those with common aperture and those with independent apertures, have been developed, each of the spectrometers typically contribute data that is processed using algorithms tailored to each of the individual spectral bands. For those skilled in the art, the spectral smile and keystone distortions of each sensor play a significant role in the sensor's ability to provide spectrally pure data for a given object in the scene. For this reason, these distortions are typically limited to a fraction of a pixel.

To increase the fidelity of the sensor and provide better target discrimination, spectral algorithms that process data from a combination of both spectral bands can be utilized. While the individual keystone distortions of the two systems may be well corrected within themselves, the magnification and spatial distortion differences between the two spectrometer systems typically differ by amounts greater than a pixel in some portions of the spatial field, making the spectral purity of data for a given object in the scene insufficient to provide reliable results over their combined spectral bands.

For a better understanding of the present invention, together with other and further objects thereof, reference is made to the accompanying drawings and detailed description.

DETAILED DESCRIPTION OF THE PREFERRED EMBODIMENTS

This invention relates to novel optical designs, which provide greater spectral fidelity and performance than previous designs.

More specifically, the embodiments disclose and describe a hyperspectral imaging optical system made up of at least two individual spectrometers, each operating over a substantially different spectral band (e.g. visible and long-wave infrared). Although systems of this type, both those with common aperture and those with independent apertures, have been developed, each of the spectrometers typically contribute data that is processed using algorithms tailored to each of the individual spectral bands. For those skilled in the art, the spectral smile and keystone distortions of each sensor play a significant role in the sensor's ability to provide spectrally pure data for a given object in the scene. For this reason, these distortions are typically limited to a fraction of a pixel.

To increase the fidelity of the sensor and provide better target discrimination, spectral algorithms that process data from a combination of both spectral bands can be utilized. While the individual keystone distortions of the two systems may be well corrected within themselves, the magnification and spatial distortion differences between the two spectrometer systems typically differ by amounts greater than a pixel in some portions of the spatial field, making the spectral purity of data for a given object in the scene insufficient to provide reliable results over their combined spectral bands.

Figure 1:
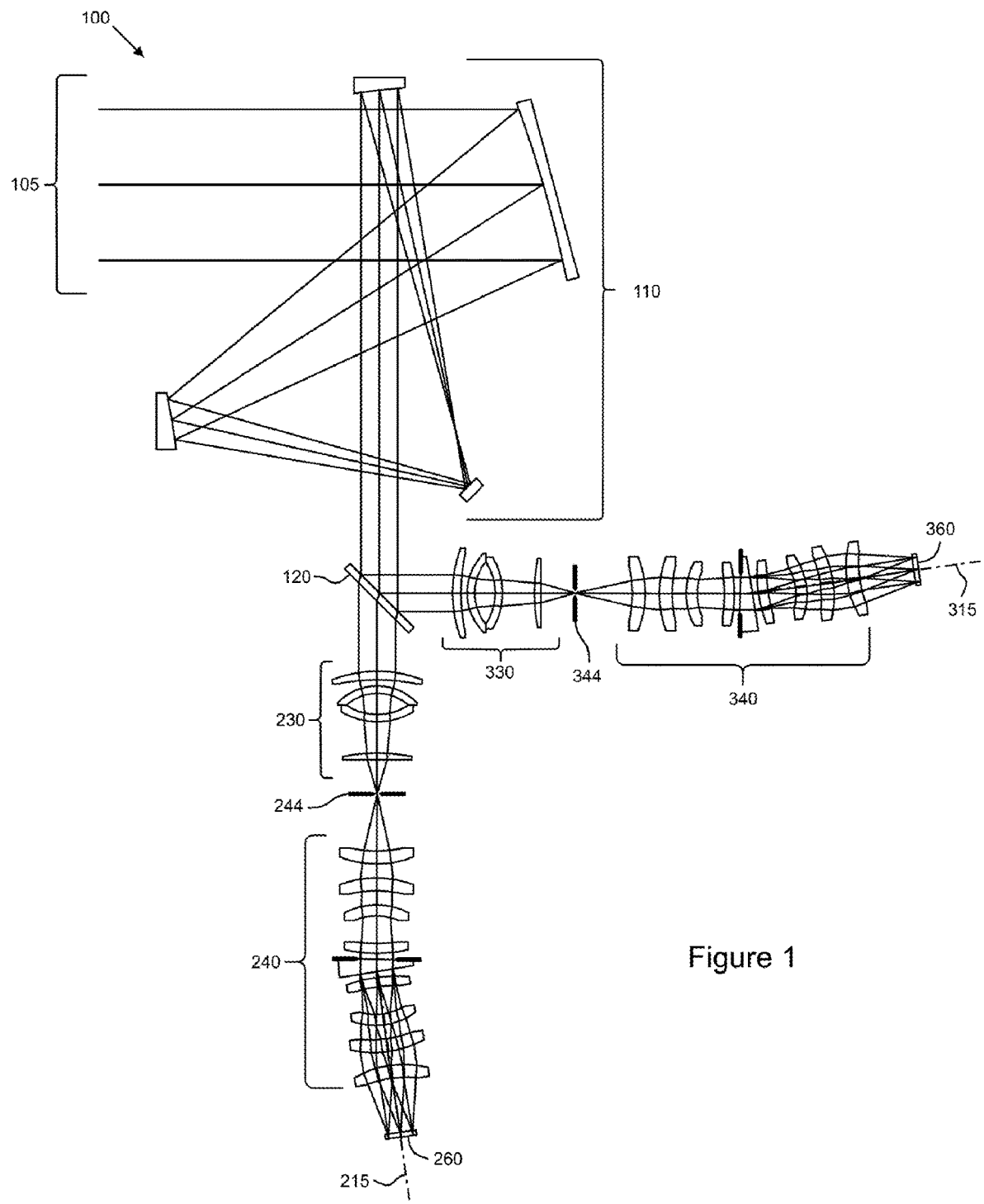
FIG. 1 is a schematic view of an embodiment of the present invention, taken along its optical axis in the plane parallel to the direction of dispersion.

Reference is made to FIG. 1, which is a schematic view of an embodiment of the present invention 100. (Exemplary embodiments of components used in FIG. 1 can be found in U.S. Pat. No. 9,885,606, corresponding to U.S. patent application Ser. No. 14/212,327, entitled COMPACT SPECTROMETER WITH HIGH SPECTRAL RESOLUTION, and filed on Mar. 14, 2014, and U.S. Pat. No. 9,568,737, entitled COMPACT COMMON APERTURE IMAGER SYSTEM, issued on Feb. 14, 2017, both of which are incorporated by reference herein in their entirety and for all purposes.) Light from a source (not shown) located at the object plane (not shown) is incident upon an afocal optical system 110, which is capable of substantially receiving the light from the source and substantially collimating the light. This substantially collimated light is then incident upon a beam splitter 120, the preferred embodiment of which is, but not limited to, a planar beam splitter, but in general is any method of separating light, by reflection, refraction, diffraction, transmission, or any combination thereof, hereinafter referred to generally as a beam splitter, which is capable of substantially transmitting a first portion of the light and capable of substantially reflecting a second portion of the light. The first portion of the light is then incident upon a first focusing optical system 230, which is capable of substantially receiving the first portion of the light and substantially transmitting that light to a first spectrometer optical system 240. The first spectrometer optical system 240 can be, without limitation, any spectrometer optical system which substantially disperses and re-images a portion of the light received from the first focusing optical system 230 to a focus position (hereinafter also referred to as an image plane) where a CCD array, phosphorescent screen, photographic film, microbolometer array, or other means of detecting light energy, hereinafter referred to generally as a detecting element 260, is located. (The image plane and the detecting element have the same identifying number.) The second portion of the light is incident upon a second focusing optical system 330 that is capable of substantially receiving the second portion of the light and substantially transmitting that light to a second spectrometer optical system 340. The second spectrometer optical system 340 can be, without limitation, any spectrometer optical system which substantially disperses and re-images a portion of the light received from the second focusing optical system 330 to a focus position (hereinafter also referred to as another image plane) where a detecting element 360 is located.

Figure 2:
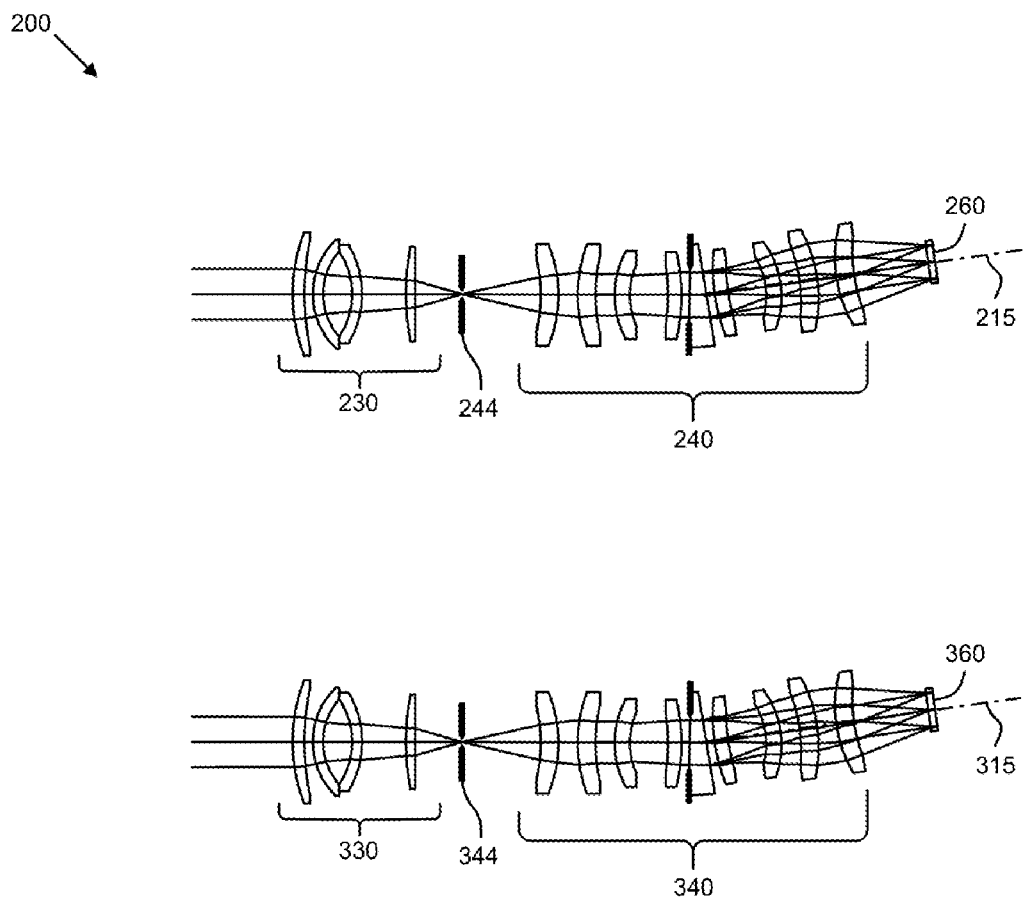
FIG. 2 is a schematic view of another embodiment of the present invention, taken along its optical axis in the plane parallel to the direction of dispersion.

Reference is made to FIG. 2, which is a schematic view of an embodiment of the present invention 200. A first portion of light from a source (not shown) located at the object plane (not shown) is incident upon a first focusing optical system 230, which is capable of substantially receiving the first portion of the light and substantially transmitting that light to an optional first spectrometer optical system 240. The first spectrometer optical system 240 can be, without limitation, any spectrometer optical system which substantially disperses and re-images a portion of the light received from the first focusing optical system 230 to a focus position of a detecting element 260. A second portion of light from a source (not shown) located at the object plane (not shown) is incident upon a second focusing optical system 330 that is capable of substantially receiving the second portion of the light and substantially transmitting that light to an optional second spectrometer optical system 340. The second spectrometer optical system 340 can be, without limitation, any spectrometer optical system which substantially disperses and re-images a portion of the light received from the second focusing optical system 330 to a focus position of a detecting element 360.

Figure 3:
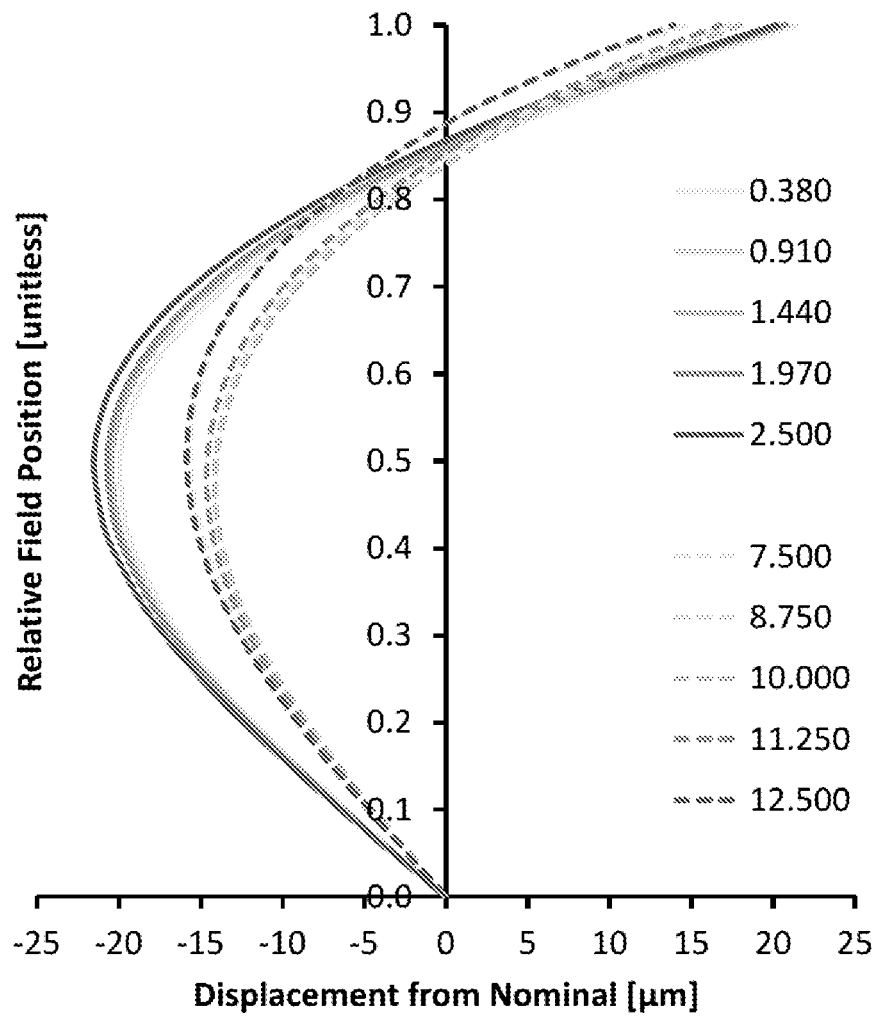
FIG. 3 is a graph of the overlaid spatial distortion characteristics of the two sensors in the embodiment of the present invention described in FIG. 1.

Reference is made to FIG. 3, which shows the spatial distortion characteristics of the combined first focusing optical system 230 and first spectrometer optical system 240 as a series of solid lines representing different wavelengths in its spectral band and the combined first focusing optical system 330 and first spectrometer optical system 340 as a series of dashed lines representing different wavelengths in its spectral band. The variation within each of the individual series represents the keystone distortion of those individual sensors, while the overlap between the red and blue series represents the degree of spatial distortion matching between the two hyperspectral systems.

In the embodiments illustrated in FIG. 1 and FIG. 2, the spatial imaging characteristics of the first and second focusing optical systems and hyperspectral optical systems are specifically designed to substantially match each other across the spatial field. In one embodiment, this is accomplished by designing the first optical system and then placing individual restrictions on the spatial field characteristics of the second optical system during the design process, thereby requiring the spatial distortion characteristics of the second optical system to substantially match or substantially minimize the difference between that of the first optical system. This can be accomplished, for example and without limitation, by varying the radii of curvature, thickness, refractive index, etc. of one or more of the optical elements in either system while constraining the desired location of the image centroids at various spatial positions such that the difference between the distortion characteristics of the two systems is substantially small relative to the size of the detecting elements of one or both systems.

For sufficient spectral purity for the application of spectral algorithms that might use data across both spectral bands, this matching would typically be limited to less than a pixel on the detector or equivalently, focal plane array. In another embodiment, the two systems may be designed simultaneously with the constraints of matched spatial distortion characteristics, where the distortion characteristics of the two systems do not differ substantially relative to the size of the detecting elements of one or both systems, or to a specific desired spatial distortion profile. In addition this spatial distortion matching can be used to balance the individual keystone distortions of the individual system to further reduce the combined spatial/spectral distortion of the system.

For the purposes of describing and defining the present teachings, it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Although the invention has been described with respect to various embodiments, it should be realized this invention is also capable of a wide variety of further and other embodiments within the spirit and scope of the invention. For example, although the embodiment shown utilizes a common aperture design, it should be noted that the matching of the spatial distortion characteristics between one or more sensors is not restricted to systems with common apertures and/or entrance pupils, and can be applied to those systems having two or more independent apertures as well. It should additionally be noted that the spectrometer systems do not need to have the same focal lengths, fields of view, apertures, pixel sizes, or instantaneous fields of view as each other to still benefit from the matched or minimized difference in spatial distortion described in this invention. This invention is not limited to optical systems having only two spectrometers but also applies to optical systems have a plurality of spectrometers of spectral bands.

Furthermore, any number of optical elements, reflective or refractive, comprising without limitation refractive, reflective, and/or diffractive elements, can be used in the embodiments of the present invention, and any aspects of the embodiments of the present invention, including but not limited to those shown, can be used in combination with one another as still further embodiments.

The invention claimed is:

1. An imaging optical system comprising:
a first imaging optical sub-system having at least one optical element; said first imaging optical sub-system being optically disposed to receive light from a source;
a first spectrometer optical sub-system having at least one optical element; said first spectrometer optical sub-system configured to substantially receive light from said first imaging optical sub-system; said first spectrometer optical sub-system being configured to disperse said light received from said first imaging optical sub-system and imaging said dispersed light onto a first image plane; said first imaging optical sub-system and said first spectrometer optical sub-system having a combined first spectral distortion characteristic;
a second imaging optical sub-system having at least one optical element; said second imaging optical sub-system being optically disposed to receive light from a source;
a second spectrometer optical sub-system having at least one optical element; said second spectrometer optical sub-system configured to substantially receive light from said second imaging optical sub-system; said second spectrometer optical sub-system being configured to disperse said light received from said second imaging optical sub-system and imaging said dispersed light onto a second image plane; said second imaging optical sub-system and said second spectrometer optical sub-system having a combined second spectral distortion characteristic; and
a difference between said combined first spectral distortion characteristic and said combined second spectral distortion characteristic being substantially minimized.

2. The imaging optical system of claim 1 wherein said second imaging optical sub-system and said second spectrometer optical sub-system are designed to substantially match said combined first and said combined second spectral distortion characteristics.

3. The imaging optical system of claim 1 wherein at least one optical element is refractive.

4. The imaging optical system of claim 1 wherein at least one optical element is reflective.

5. The imaging optical system of claim 1 further comprising:
at least one detecting element located substantially at said first image plane.

6. An imaging optical system comprising:
a first imaging optical sub-system having at least one optical element; said first imaging optical sub-system being optically disposed to receive light from a source;
a first spectrometer optical sub-system having at least one optical element; said first spectrometer optical sub-system configured to substantially receive light from said first imaging optical sub-system; said first spectrometer optical sub-system being configured to disperse said light received from said first imaging optical sub-system and imaging said dispersed light onto a first image plane; said first imaging optical sub-system and said first spectrometer optical sub-system having a combined first spatial distortion characteristic;
a second imaging optical sub-system having at least one optical element; said second imaging optical sub-system being optically disposed to receive light from a source;
a second spectrometer optical sub-system having at least one optical element; said second spectrometer optical sub-system configured to substantially receive light from said second imaging optical sub-system; said second spectrometer optical sub-system being configured to disperse said light received from said second imaging optical sub-system and imaging said dispersed light onto a second image plane; said second imaging optical sub-system and said second spectrometer optical sub-system having a combined second spatial distortion characteristic; and
a difference between said combined first spatial distortion characteristic and said combined second spatial distortion characteristic being substantially minimized.

7. The imaging optical system of claim 6 wherein said second imaging optical sub-system and said second spectrometer optical sub-system are designed to substantially match said combined first and said combined second spatial distortion characteristics.

8. The imaging optical system of claim 6 wherein at least one optical element is refractive.

9. The imaging optical system of claim 6 wherein at least one optical element is reflective.

10. The imaging optical system of claim 6 further comprising:
at least one detecting element located substantially at said first image plane.

11. An imaging optical system comprising:
a plurality of imaging optical sub-systems having at least one optical element; said plurality of imaging optical sub-systems being optically disposed to receive light from a source;
a plurality of spectrometer optical sub-systems having at least one optical element; each spectrometer optical sub-system of said plurality of spectrometer optical sub-systems configured to substantially receive light from at least one imaging optical sub-system of said plurality of imaging optical sub-systems;
a plurality of image planes; each spectrometer optical sub-system of said plurality of spectrometer optical sub-systems being configured to disperse said light received from said plurality of imaging optical sub-systems and imaging said dispersed light onto at least one image plane of said plurality of image planes;
a plurality of spectral distortion characteristics; at least two imaging optical sub-system and spectrometer optical sub-system of said plurality of imaging optical sub-systems and said plurality of spectrometer optical sub-systems having a spectral distortion characteristic of said plurality of spectral distortion characteristics; a difference between at least two spectral distortion characteristics of said plurality of spectral distortion characteristics being substantially minimized.

12. The imaging optical system of claim 11 wherein spectral distortion characteristics of said at least two imaging optical sub-system and spectrometer optical sub-system of said plurality of imaging optical sub-systems and said plurality of spectrometer optical sub-systems are designed to be substantially matched.

13. The imaging optical system of claim 11 wherein at least one optical element is refractive.

14. The imaging optical system of claim 11 wherein at least one optical element is reflective.

15. The imaging optical system of claim 11 further comprising:
   at least one detecting element located substantially at a first image plane.

16. An imaging optical system comprising:
   a plurality of imaging optical sub-systems having at least one optical element; said plurality of imaging optical sub-systems being optically disposed to receive light from a source;
   a plurality of spectrometer optical sub-systems having at least one optical element; each spectrometer optical sub-system of said plurality of spectrometer optical sub-systems configured to substantially receive light from at least one imaging optical sub-system of said plurality of imaging optical sub-systems;
   a plurality of image planes; each spectrometer optical sub-system of said plurality of spectrometer optical sub-systems being configured to disperse said light received from said plurality of imaging optical sub-systems and imaging said dispersed light onto at least one image plane of said plurality of image planes;
   a plurality of spatial distortion characteristics; at least two imaging optical sub-system and spectrometer optical sub-system of said plurality of imaging optical sub-systems and said plurality of spectrometer optical sub-systems having a spatial distortion characteristic of said plurality of spatial distortion characteristics; a difference between at least two spatial distortion characteristics of said plurality of spatial distortion characteristics being substantially minimized.

17. The imaging optical system of claim 16 wherein spatial distortion characteristics of said at least two imaging optical sub-system and spectrometer optical sub-system of said plurality of imaging optical sub-systems and said plurality of spectrometer optical sub-systems are designed to be substantially matched.

18. The imaging optical system of claim 16 wherein at least one optical element is refractive.

19. The imaging optical system of claim 16 wherein at least one optical element is reflective.

20. The imaging optical system of claim 16 further comprising:
   at least one detecting element located substantially at a first image plane.

* * * * *